G. E. WHITNEY.
PRESS.
APPLICATION FILED JULY 5, 1918.
1,372,791.
Patented Mar. 29, 1921.
2 SHEETS—SHEET 1.
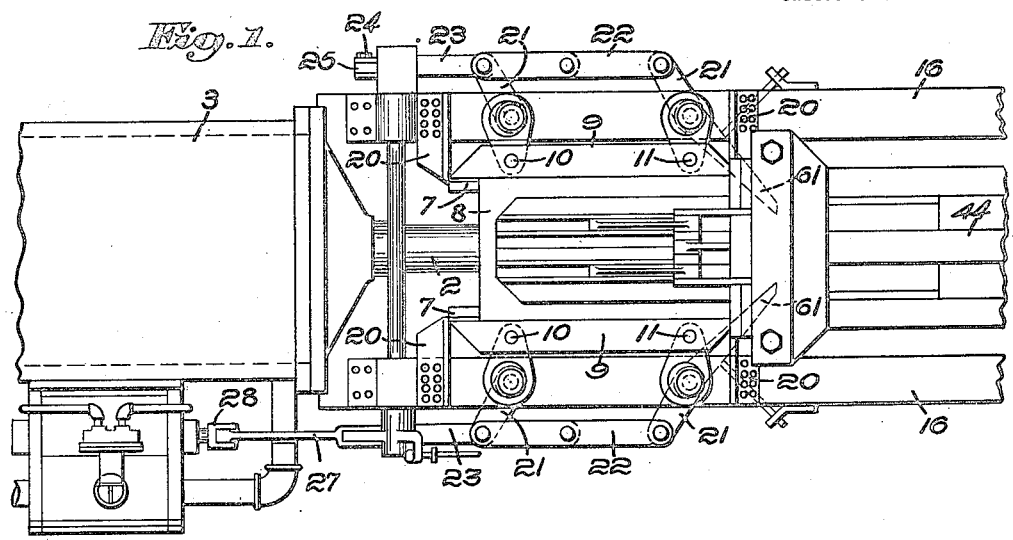
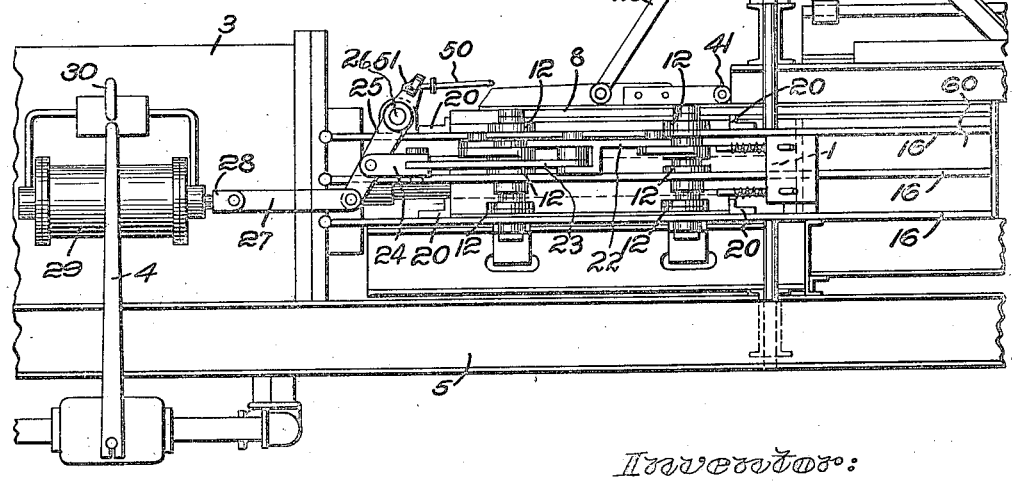
Inventor:
George E. Whitney.
By Emery, Booth, Janney & Varney
Attys.

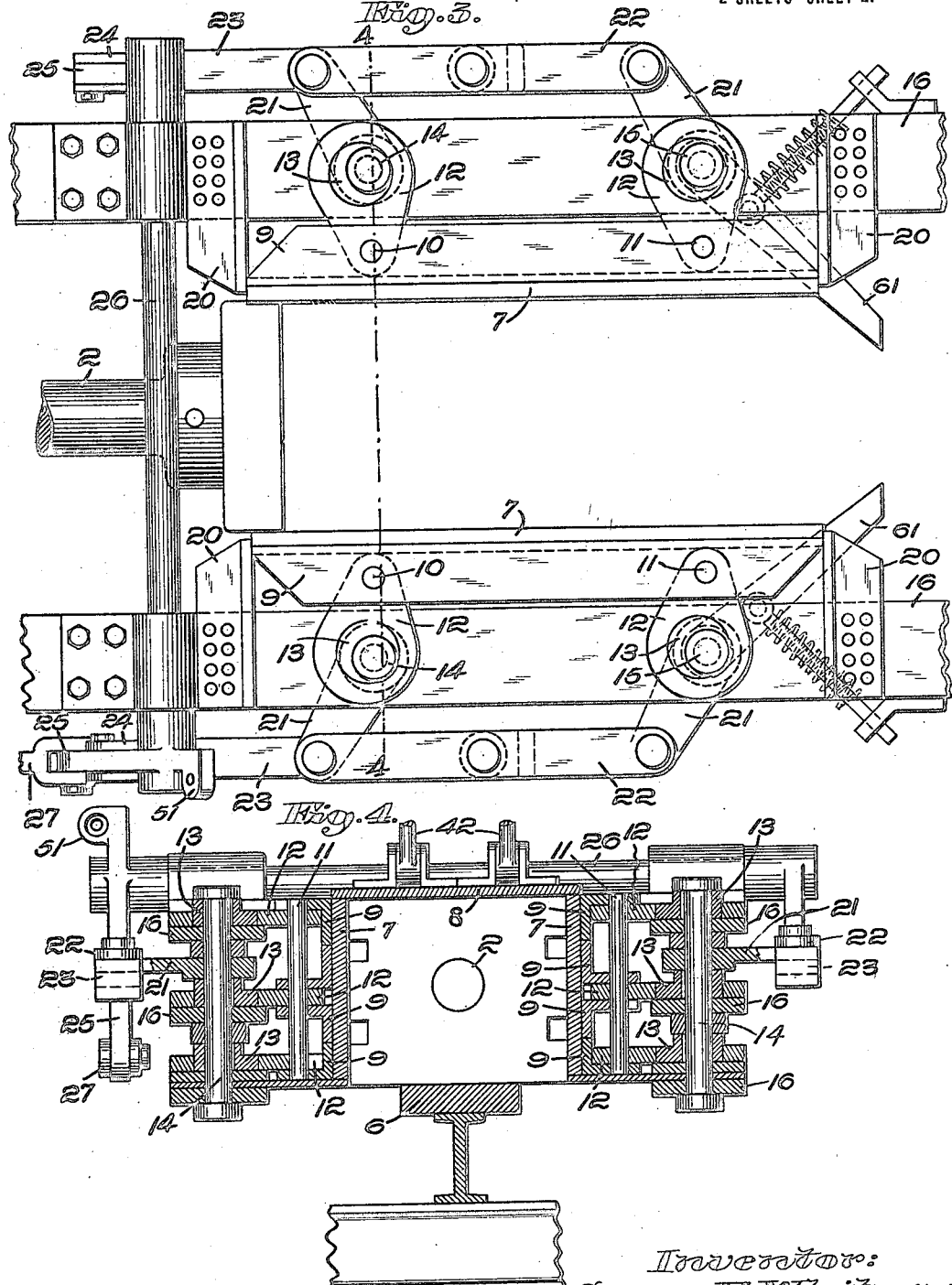

UNITED STATES PATENT OFFICE.

GEORGE E. WHITNEY, OF BRIDGEPORT, CONNECTICUT, ASSIGNOR TO UNITED STATES COMPRESSING CORPORATION, OF NEW YORK, N. Y., A CORPORATION OF NEW YORK.

PRESS.

1,372,791.  Specification of Letters Patent.  Patented Mar. 29, 1921.

Application filed July 5, 1918. Serial No. 243,289.

*To all whom it may concern:*

Be it known that I, GEORGE E. WHITNEY, a citizen of the United States, and a resident of Bridgeport, county of Fairfield, and State of Connecticut, have invented an Improvement in Presses, of which the following description, in connection with the accompanying drawings, is a specification, like characters on the drawings representing like parts.

This invention relates to presses, and more particularly, though not exclusively, to presses for forming composite, highly compressed bales of loose material such as hay, excelsior, cotton or the like, which has already been partly compressed or baled.

The invention will be best understood by reference to the following description when taken in connection with the accompanying illustration of one specific embodiment thereof, while its scope will be more particularly pointed out in the appended claim.

In the drawings:—

Figure 1 is a plan view of that portion of the parts adjacent one of the hoppers;

Fig. 2 is a side elevation of the portion of the parts shown in Fig. 1;

Fig. 3 is a plan view showing on an enlarged scale side-door closing mechanism for the materials receiving chamber or hopper; and Fig. 4 is a cross-sectional elevation of the same on the line 4—4 of Fig. 3.

While the invention may have widely different applications, and may be embodied in presses for handling loose hay or other material, in the drawings I have illustrated one form of the invention as applied to a press which is intended to receive bales of hay as formed by the ordinary hay-baling machine, and to compress the same to a greater density.

In the drawings, I have illustrated only that portion of one-half or one end of the press which is contiguous to the bale-receiving chamber, the constructional features therein shown being preferably used in connection with a press of the type which is more completely shown in my co-pending application Serial No. 92,322, filed April 19, 1916.

In the specific form of press therein disclosed, and herein partially illustrated, the bales are intended to be placed one at a time, without removing their bindings, in a hopper or materials-receiving chamber and are compressed in succession therein by the action of a plunger which forces the last bale against the preceding and already compressed bale. The bales are advanced step by step through the action of the plunger, each bale when fully compressed being held in that condition by spring-pressed dogs. The plunger then recedes, the hopper is opened, another bale inserted, the hopper is closed again and the action repeated and the last inserted bale compressed against the previously compressed bale.

Each bale is compressed in the first instance by the plunger to substantially the full degree of compression required for the composite bale. The hopper discharges through a molding chamber into a runway holding a series of bales, which runway is provided with friction surfaces adjustable to retard the passage of the bales therethrough and provide the resistance against which the compression of the bale takes place. The bales are bound together while in transit in the runway in sets of two or more, while held under compression, spacing blocks being inserted between appropriate bales to admit of the insertion of the bindings.

Referring to the drawings and more particularly to Figs. 1 and 2, a compressing plunger 1 (shown in the drawings by dotted lines) is secured to one end of the piston rod 2, the latter having a reciprocatory piston working in the pressure fluid cylinder 3. The admission of pressure fluid to one end of the cylinder and the simultaneous exhaust from the opposite end, is controlled by any suitable valve which may be operated by the hand lever 4 (Fig. 2). The press is double-ended, the opposite end of the piston rod 2 having another plunger similar to the plunger 1, and as the bale is compressed in one side or end the plunger in the opposite side is retracted to permit another bale to be introduced. Each side or end of the press is complete in itself, and the two are alike in construction, so that a description and illustration of one side only is necessary.

The machine is mounted upon any suitable supports, such as the I-beams 5 suitably anchored together. Next adjacent the cylinder 3 and rigidly secured thereto, is a materials-receiving chamber or hopper in which the plunger 1 is adapted to reciprocate. This chamber (see Fig. 4) is provided with a fixed bottom plate 6 and opposite side doors 7, together with the top door 8, the doors 7 and 8 being adapted to open to permit the ready insertion of the bale. In the press shown in my aforesaid co-pending application, and also in the press shown in my prior Patent No. 1,217,893, side doors for a materials-receiving chamber are provided movably mounted upon toggle levers so arranged that the movement of the actuating levers imparts not only an inward or closing movement to the side doors, but also a longitudinal movement lengthwise the bale. I have found that such toggle-actuated compound movement of the door renders the closing of the door uncertain in this type of press, frequently leaving the door in a partially closed position at the time the plunger moves forward. In the present construction I have disclosed means whereby the doors are closed preferably automatically by actuating devices which give the side doors a straight-line inward closing movement and reversely in a straight-line outward opening movement. This action of the side doors I find more effective. While this movement may be accomplished in other ways, herein I have secured a mechanically efficient action by the employment of a system of eccentrically mounted links or straps which on the actuation of suitable pressure-controlled devices move the doors on their respective guides inwardly or outwardly in a straight line movement.

For this purpose each side door plate 7 is secured to angle irons 9, herein four in number, the angle irons for each door having secured thereto a pair of upright pins 10 and 11, to each of which are pivotally secured one or more (herein three) outwardly and laterally-extending eccentric straps 12. The latter are provided with eccentrics 13 secured to the upright eccentric shafts 14 and 15 which are mounted for turning movement in the longitudinally extending and rigid side bars 16 of the frame. The rotation of the upright shafts 14 turns the series of eccentrics thereon and acts to move the eccentric straps and the attached side doors inwardly or outwardly, according to the direction of rotation.

In order to insure a straight-line movement of the side doors, stationary guides are provided in the form of laterally arranged angle irons 20 (Figs. 1, 2 and 3) fastened to the rigid side bars 16, the edges of the door having a sliding guiding contact with the faces of the angle iron guides 20. Herein two pairs of guide members 20 are provided for each side door, one pair being fastened to the upper side bar 16, and the other pair to the lower side bar.

In order to turn the eccentric shafts 14 and move the doors, each shaft has fixedly secured thereon the lever arm 21 pivoted to the longitudinally extending link 22, the latter being in turn jointed to the link 23 pivotally connected by the jointed connection 24 (Fig. 2) to the depending rocker arm 25 secured to the transverse rock shaft 26.

The rock shaft 26 has a rocker arm 25 at each end thereof, one rocker arm serving to actuate the linkage and eccentrics for one of the side doors, and the remaining rocker arm the linkage and eccentrics for the remaining side door. The rocker shaft 26 is turned by means of the connecting rod 27 having jointed connection to a prolongation of one of the rocker arms 25 and connected at its opposite end to the piston rod 28, the latter having a reciprocatory piston (not shown) adapted to be moved within the cylinder 29 by the admission of pressure to one or the other end of the cylinder through the manual control of a valve, the hand lever of which is represented at 30.

When the piston is moved to one end of the cylinder by manipulation of the valve lever 30, the shaft 26 is rocked and the eccentrics turned in such direction as to swing the doors to open the hopper. When the piston is moved in the opposite direction, the movement of the link 27 is reversed, turning the eccentrics reversely, and positively and forcibly moving the doors into their closed position.

This provides a powerful door-closing mechanism which may be made to exert a maximum leverage at the point where the doors approach their fully closed position, while at the same time it is self-locking against reverse movement under pressure from within and permits straight-line inward and outward movement of the doors under the guidance of the guiding plates 20.

The hopper is herein also provided with the top door 8 which is hinged at 41 to the frame of the press, this door being closed by toggle links 42 (see Fig. 2) controlled by a connecting link 43 and a piston rod 44 connected to a piston and pressure fluid cylinder (not shown). The top door may be automatically closed simultaneously with the closure of the side doors by any suitable means such as the link 50 which connects the controlling valve for the pressure cylinder for the top door with one of the depending rocker arms 25, so that as the latter moves toward a door-closing position, the said valve is moved to admit pressure to simultaneously close the top door. Preferably the arrangement is such that the side doors are caused to close just in advance of the closure of the top door, and conversely are caused to open just in advance of the opening of the top door, this result herein being secured by causing the link 50 to be moved by the rocker arm through a lug 51 on the arm engaging separated lugs or collars on the link which allow for more or less lost motion.

In the operation of the press, the bales are preferably forced from the hopper into an adjoining molding chamber 60 (Fig. 2), the latter being wholly closed in by box-shaped sides, top and bottom of the necessary distance apart to produce the desired size of compressed bale. With a press of the character shown, two or more of the ordinary bales of hay may be compressed into one bale, the density depending upon the amount of friction to be overcome by the plunger in moving the bales along the runway and discharging them from the machine, as more fully set forth in my co-pending application.

In passing from the hopper to the molding chamber, the bale is forced along past spring-pressed yielding dogs 61 which move in behind the bale and retain it in the baling or molding chamber when the plunger is retracted.

In the operation of the press, the bale is passed from the molding chamber into a track or runway, not herein shown, which runway is provided with friction members adjustable to impart the necessary friction to the passage of the bales. While the bales are in the runway, bindings may be placed thereon to bind together two or more previously formed individual bales, the bales being discharged one by one under the pressure of the last bale compressed upon any suitable platform or table (not herein shown). The details of the runway are fully disclosed in my co-pending application referred to.

While I have herein shown and described for purposes of illustration one specific embodiment of the invention, it is to be understood that the same is for illustration only, and that the constructional details and relative arrangement of parts may be varied within wide limits without departing from the spirit of the invention.

Claim:

In a press, the combination with a plunger, of a receiving chamber, a top door therefor, laterally movable side doors, means for guiding said side doors to move in a straight-line movement toward and from the receiving chamber, and means for simultaneously opening or closing said top and side doors.

In testimony whereof, I have signed my name to this specification.

GEORGE E. WHITNEY.